US011287372B2

(12) United States Patent
Koizumi et al.

(10) Patent No.: US 11,287,372 B2
(45) Date of Patent: Mar. 29, 2022

(54) GAS SENSOR MODULE

(71) Applicant: Asahi Kasei Microdevices Corporation, Tokyo (JP)

(72) Inventors: Yoshihiko Koizumi, Tokyo (JP); Yuji Goda, Tokyo (JP); Maksym Bryzgalov, Delsbo (SE)

(73) Assignee: Asahi Kasei Microdevices Corporation, Tokyo (JP)

( * ) Notice: Subject to any disclaimer, the term of this patent is extended or adjusted under 35 U.S.C. 154(b) by 0 days.

(21) Appl. No.: 17/201,056

(22) Filed: Mar. 15, 2021

(65) Prior Publication Data
US 2021/0285872 A1 Sep. 16, 2021

(30) Foreign Application Priority Data

Mar. 16, 2020 (JP) .............................. JP2020-045698

(51) Int. Cl.
*G01N 21/3504* (2014.01)
(52) U.S. Cl.
CPC ................. *G01N 21/3504* (2013.01)
(58) Field of Classification Search
CPC ................................................... G01N 21/35
See application file for complete search history.

(56) References Cited

U.S. PATENT DOCUMENTS

| 2007/0171180 | A1 | 7/2007 | Akiyama | |
| 2012/0126713 | A1* | 5/2012 | Horino | H05B 45/3725 315/187 |
| 2012/0299642 | A1* | 11/2012 | Hamada | G11C 5/145 327/536 |
| 2013/0271751 | A1 | 10/2013 | MacGegor et al. | |
| 2016/0143566 | A1 | 5/2016 | Ballam et al. | |
| 2016/0231244 | A1* | 8/2016 | Camargo | G01N 21/61 |

FOREIGN PATENT DOCUMENTS

| JP | 2000215990 A | 8/2000 |
| JP | 2013545094 A | 12/2013 |
| WO | 2005078810 A1 | 8/2005 |

OTHER PUBLICATIONS

Gibson et al. "A Novel Solid State Non-Dispersive Infrared CO2 Gas Sensor Compatible with Wireless and Portable Deployment," Sensors 2013, 13, 7079-7103, published May 2013 (Year: 2013).*

* cited by examiner

*Primary Examiner* — David P Porta
*Assistant Examiner* — Meenakshi S Sahu
(74) *Attorney, Agent, or Firm* — Kenja IP Law PC

(57) ABSTRACT

A gas sensor module (100) includes an infrared light emitting diode (10) configured to emit infrared light in accordance with a drive current, a quantum infrared sensor (20) configured to detect infrared light that passes through a detection target gas, a drive circuit (30) configured to output the drive current to the infrared light emitting diode (10), a charging circuit (50) to be connected to a power source and configured to output a charge current having a smaller current amount than the drive current, and a capacitor (40) configured to charge by the charge current being supplied from the charging circuit (50) and discharge by supplying the drive current to the drive circuit (30).

5 Claims, 11 Drawing Sheets

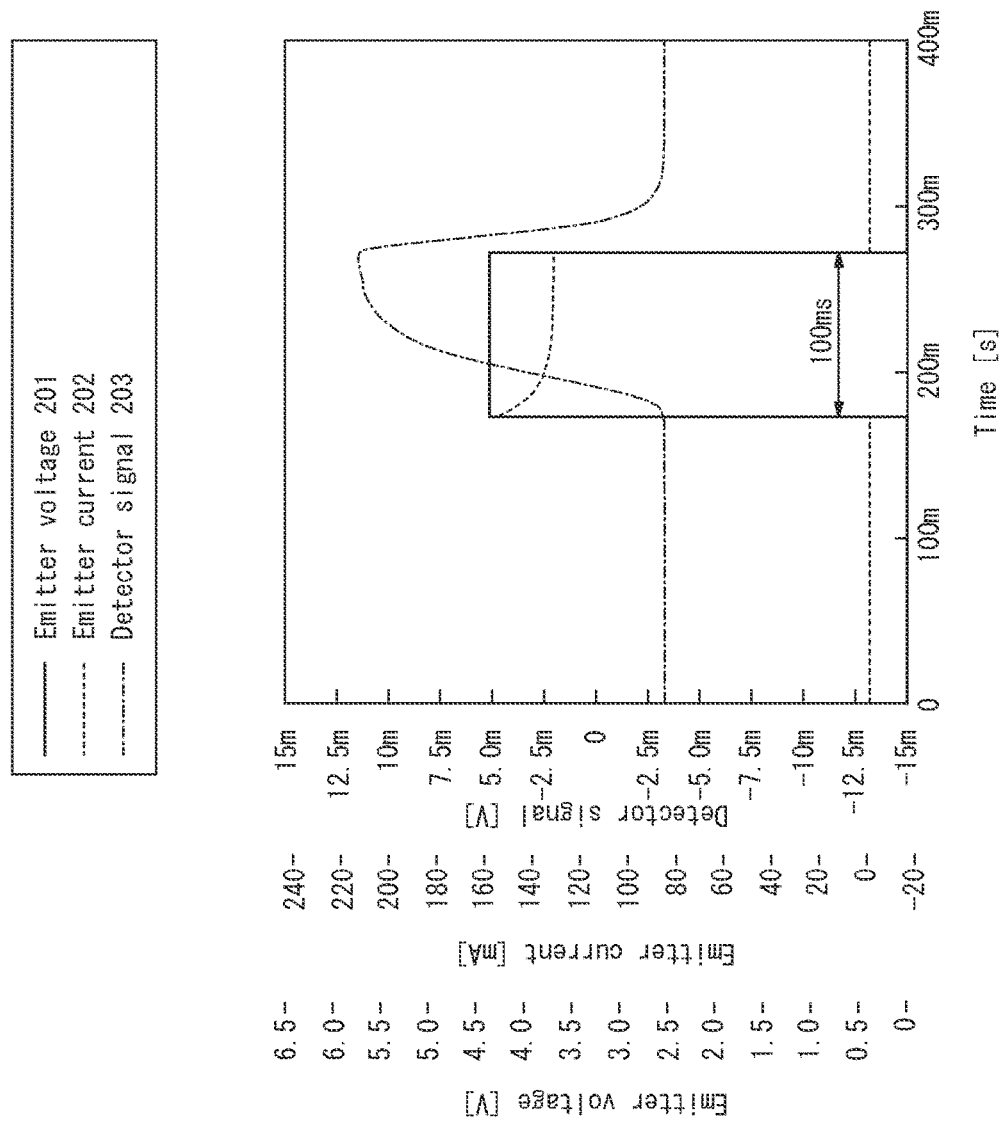

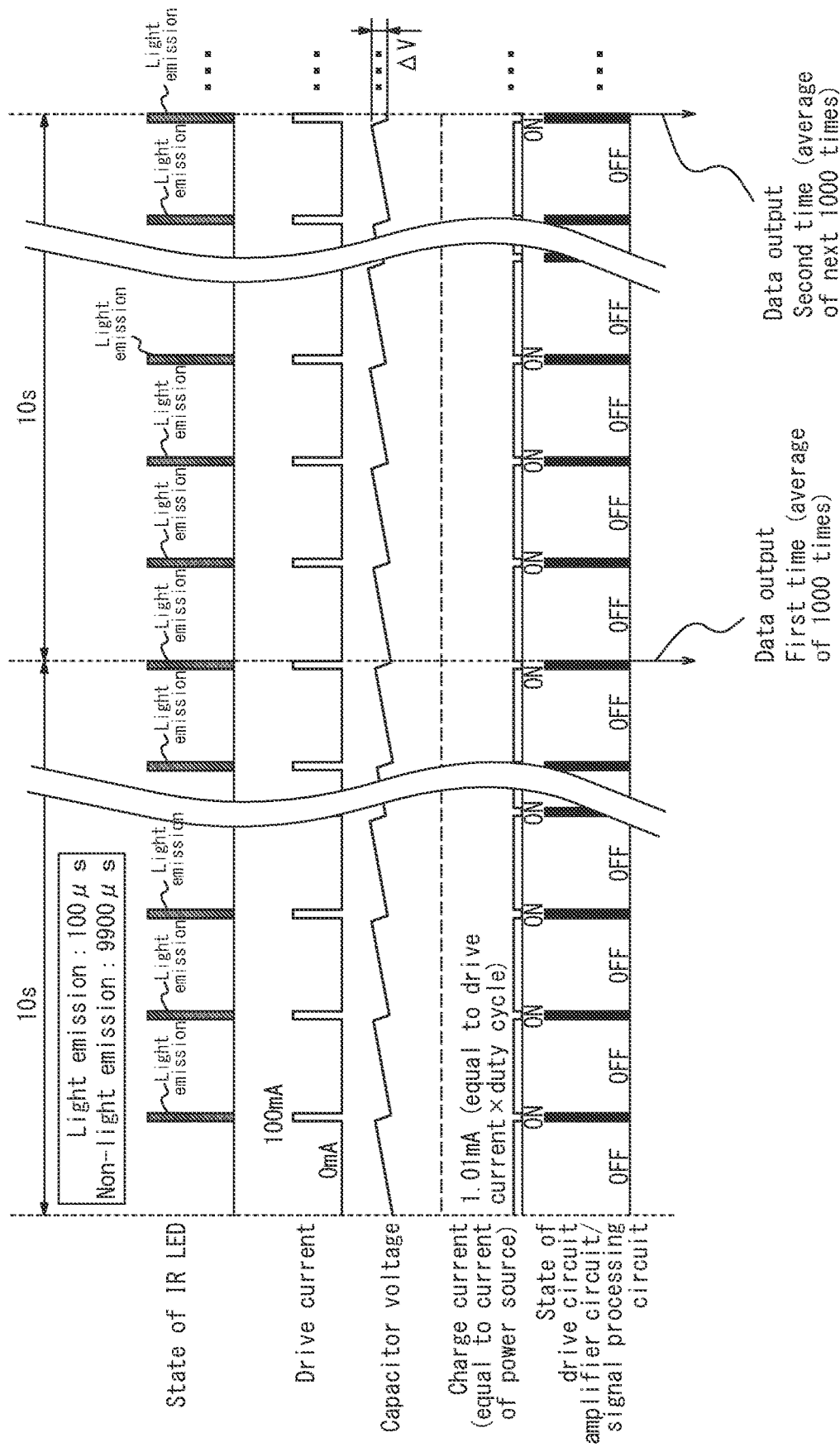

GAS SENSOR MODULE

TECHNICAL FIELD

The present disclosure relates to a gas sensor module.

BACKGROUND

In the context of incandescent lamps used in $CO_2$ gas sensors, a known drive method of a light source for a $CO_2$ gas sensor controls the voltage of the incandescent lamp so that the filament resistance is constant while the lamp is lit.

In recent years, development of a non-dispersive infrared (NDIR) gas sensor has also begun. This gas sensor includes a light emitter configured to emit infrared light and a light detector configured to detect infrared light that passes through a detection target gas (for example, $CO_2$ gas). The gas sensor uses the absorption characteristics of the infrared light in the gas to detect the concentration of the gas.

CITATION LIST

Patent Literature

PTL 1: JP 2000-215990 A

SUMMARY

NDIR gas sensors have an extremely large drive current (peak current) as compared to other environmental sensors such as temperature/humidity sensors or pressure sensors. Therefore, in a known gas sensor module 100A that includes a light emitter 10A such as a tungsten lamp (incandescent lamp) or micro electro mechanical systems (MEMS) heater and a light detector 20A such as a pyroelectric sensor or thermopile, as illustrated in FIG. 7, an excessive load is placed on a power source 60A.

It would be helpful to provide a gas sensor module that can reduce the load on the power source.

A gas sensor module according to an embodiment includes an infrared light emitting diode configured to emit infrared light in accordance with a drive current, a quantum infrared sensor configured to detect infrared light that passes through a detection target gas, a drive circuit configured to output the drive current to the infrared light emitting diode, a charging circuit to be connected to a power source and configured to output a charge current having a smaller current amount than the drive current, and a capacitor configured to charge by the charge current being supplied from the charging circuit and discharge by supplying the drive current to the drive circuit.

According to the present disclosure, a gas sensor module that can reduce the load on the power source can be provided.

BRIEF DESCRIPTION OF THE DRAWINGS

In the accompanying drawings:

FIG. 2C is a diagram illustrating an example of the responsiveness of a known light emitter;

FIG. 5A is a diagram illustrating the gas sensor module according to the present embodiment;

DETAILED DESCRIPTION

Embodiments are described in detail below with reference to the drawings.

An example configuration of the gas sensor module 100 according to the present embodiment is described below with reference to FIGS. 1 to 4.

Figure 1:
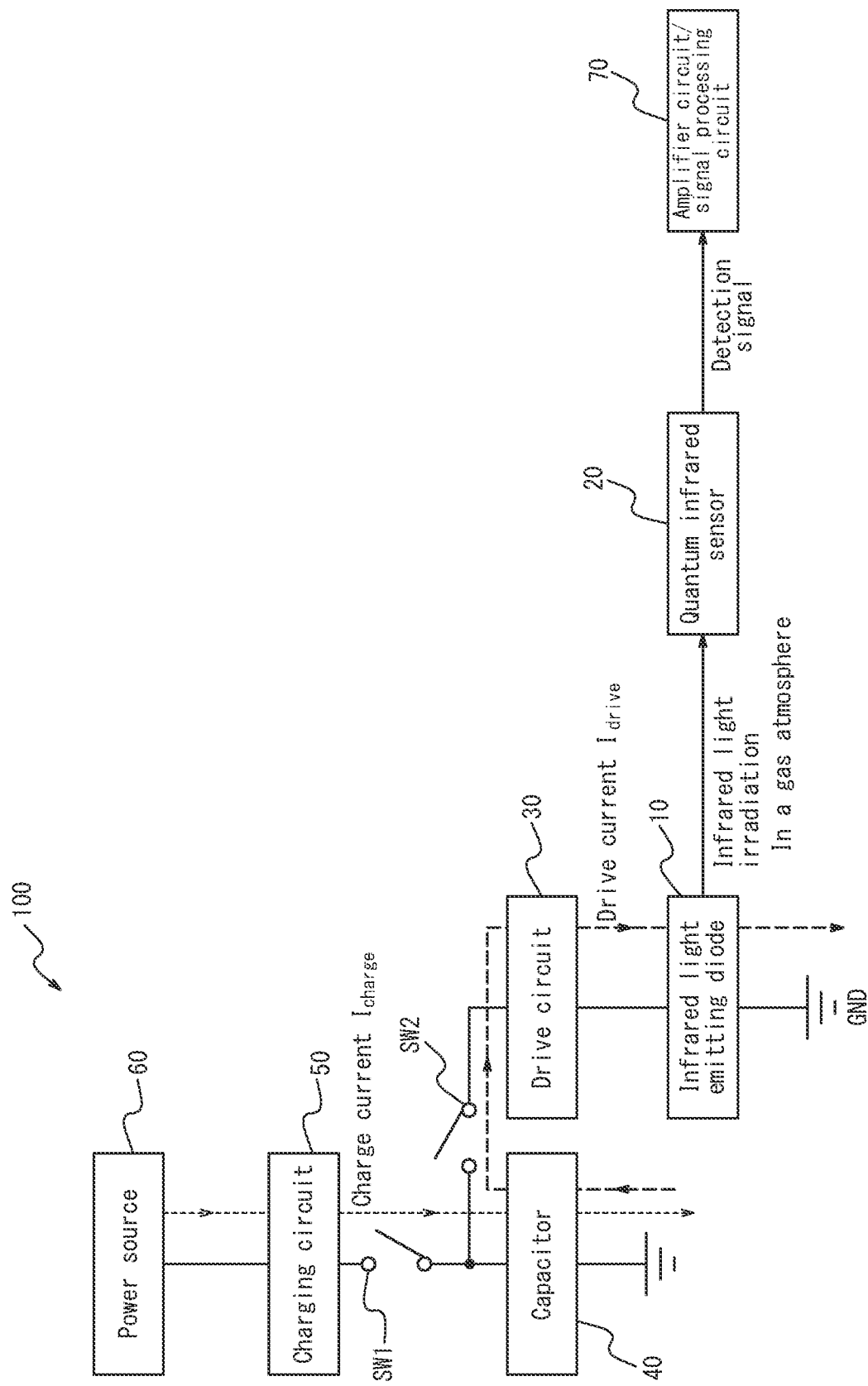
FIG. 1 is a diagram illustrating a configuration example of a gas sensor module according to the present embodiment.

As illustrated in FIG. 1, the gas sensor module 100 includes an infrared light emitting diode 10, a quantum infrared sensor 20, a drive circuit 30, a capacitor 40, a charging circuit 50, a power source 60, and an amplifier circuit/signal processing circuit 70.

The infrared light emitting diode 10 emits infrared light in accordance with a drive voltage $I_{drive}$ supplied by the drive circuit 30. The infrared light emitting diode 10 is used as a light source for sensing a detection target gas (for example, $CO_2$ gas) that has absorption characteristics with respect to infrared light. The infrared light emitting diode 10 preferably emits light in the wavelength region of 2.0 μm to 12.0 μm.

The infrared light emitting diode 10 is preferably configured as a light source with good responsiveness.

Figure 2A:
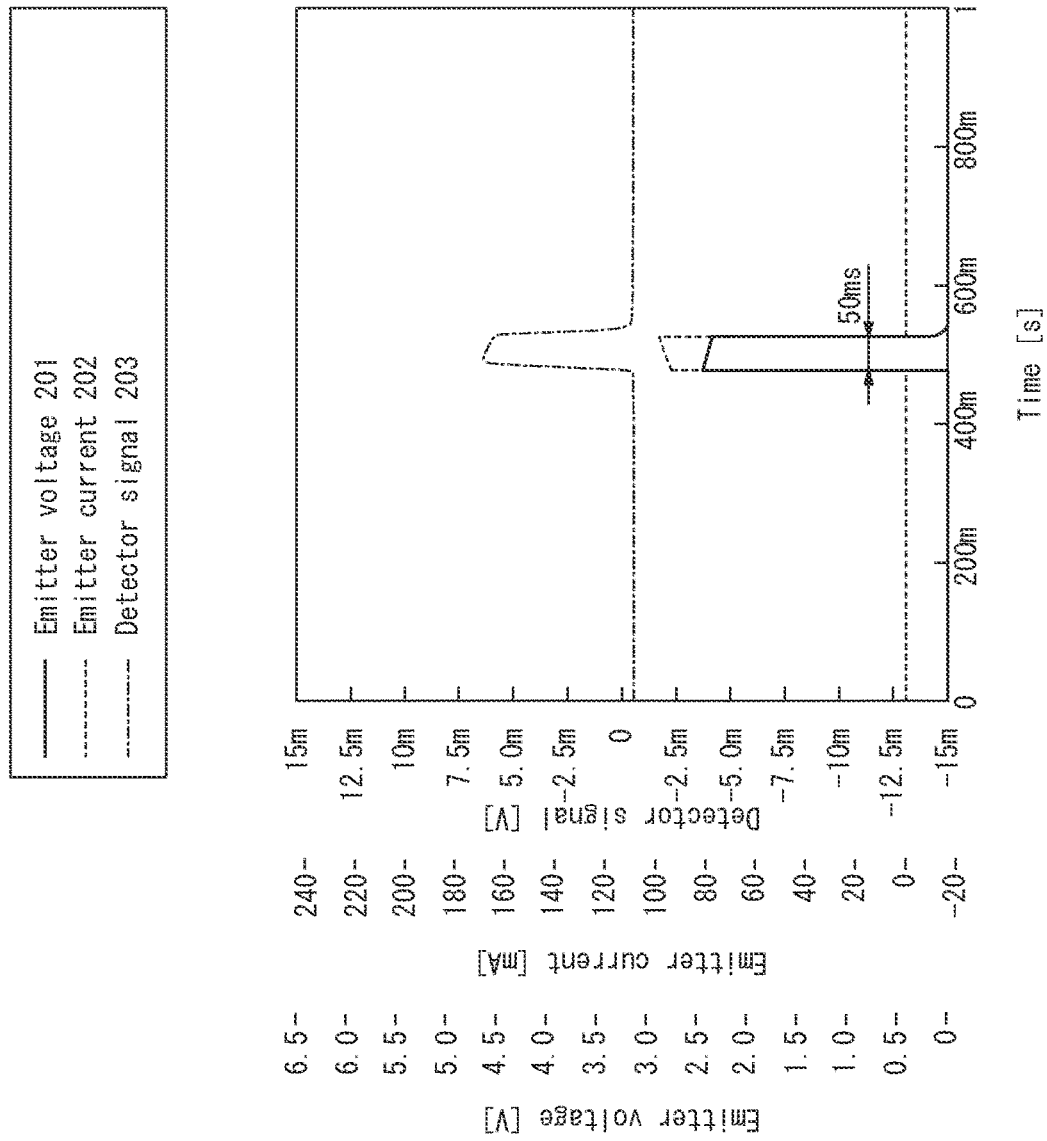
FIG. 2A is a diagram illustrating an example of responsiveness of an infrared light emitting diode according to the present embodiment.
Figure 2B:
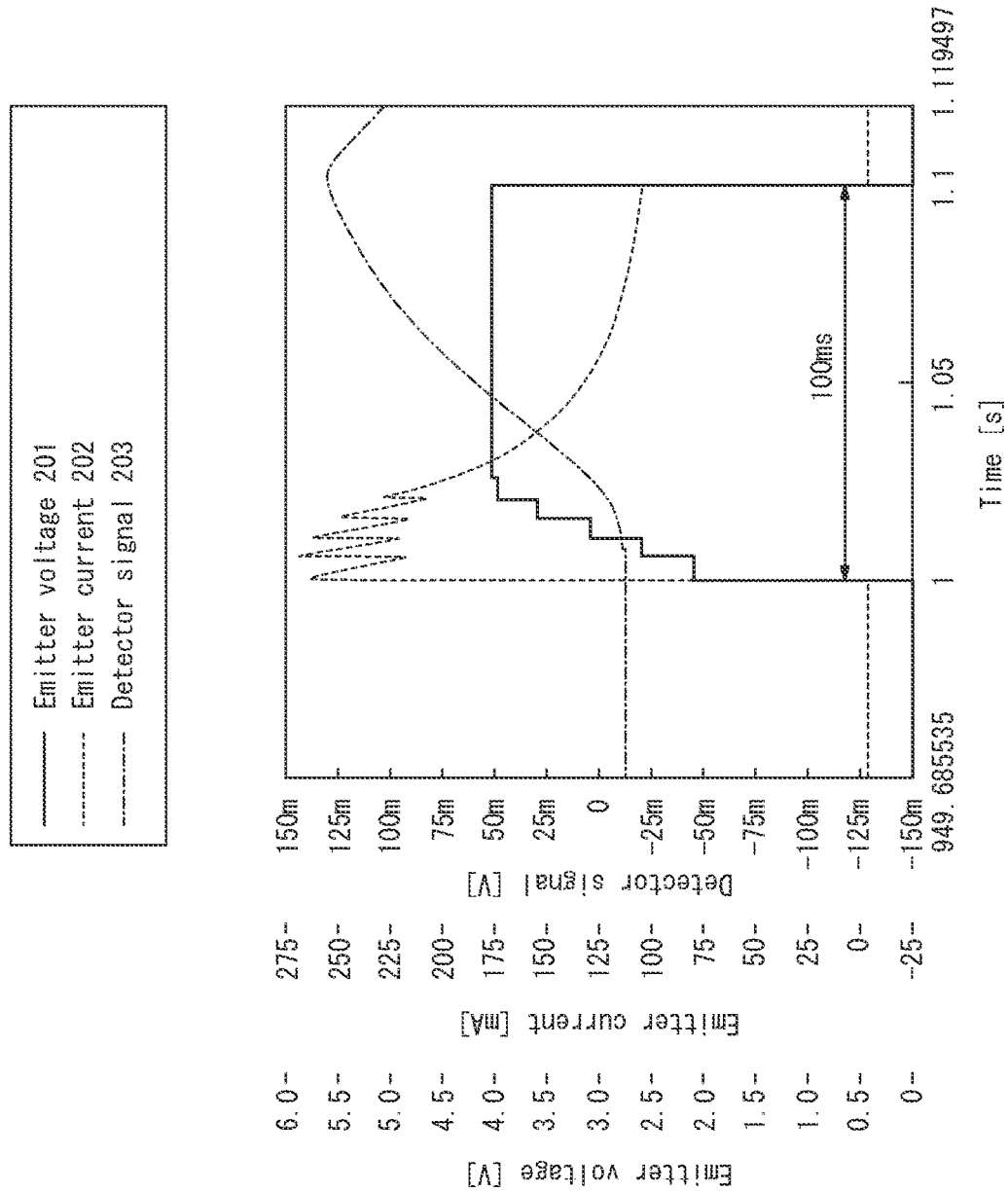
FIG. 2B is a diagram illustrating an example of the responsiveness of a known light emitter.

With reference to FIGS. 2A to 2C, the responsiveness of the infrared light emitting diode 10 according to the present embodiment and the responsiveness of a known light emitter are described. FIG. 2A illustrates an example of the responsiveness of an infrared light emitting diode. FIG. 2B illustrates an example of the responsiveness of a tungsten lamp. FIG. 2C illustrates an example of the responsiveness of a micro electro mechanical systems (MEMS) heater. For the sake of comparison, a quantum infrared sensor with good responsiveness is used in the light detectors to obtain detection signals that depend on the responsiveness of the light emitters.

In FIG. 2A, the graph 201 illustrates the drive voltage of the infrared light emitting diode 10. The graph 202 illustrates the drive current of the infrared light emitting diode 10. The graph 203 illustrates the detection signal of the light detector.

In FIGS. 2B and 2C, the graph 201 illustrates the drive voltage of a known light emitter. The graph 202 illustrates the drive current of a known light emitter. The graph 203 illustrates the detection signal of the light detector.

From the graph 203 in FIG. 2A, it is clear that when an infrared light emitting diode is used, the time constant of the detection signal is approximately several μs (a value<<ms). From the graph 203 in FIG. 2B, it is clear that when a tungsten lamp is used, the time constant of the detection signal is approximately 50 ms. From the graph 203 in FIG. 2C, it is clear that when a MEMS heater is used, the time constant of the detection signal is approximately 30 ms.

Furthermore, from the graphs 201, 202, and 203 in FIG. 2A, it is clear that the time from when the drive current is supplied to the infrared light emitting diode until the detection signal reaches its peak value is extremely short, with the peak occurring immediately after the supply of the drive current begins. From the graphs 201, 202, and 203 in FIG. 2B, it is clear that the time from when the drive current is supplied to the tungsten lamp until the detection signal reaches its peak value is approximately 100 ms or longer. From the graphs 201, 202, and 203 in FIG. 2C, it is clear that the time from when the drive current is supplied to the MEMS heater until the detection signal reaches its peak value is approximately 100 ms or longer.

From FIGS. 2A through 2C, it is clear that the infrared light emitting diode has far better responsiveness than the tungsten lamp or the MEMS heater. This suggests that the infrared light emitting diode can achieve a much shorter drive time each time than the tungsten lamp or MEMS heater. For example, the drive time can be kept to 1 ms or shorter. As a shorter range, the drive time can be kept to approximately 10 μs to 100 μs. The duty cycle (the proportion of time during which drive current flows during each drive cycle) can also be kept small, for example to 10% or less. In this way, a low power consumption gas sensor module can be achieved while reducing the load on the power source. In a light emitting diode that emits visible light, for example, the light emission amount itself is important, whereas in the case of a gas sensor module, it suffices to adopt a drive time allowing the necessary SN ratio to be obtained. Furthermore, since a monitoring cycle for gas concentration on the order of seconds is typically sufficient, the drive cycle can be relatively long.

The quantum infrared sensor 20 detects the infrared light that passes through the detection target gas. In accordance with the detected amount of infrared light, the quantum infrared sensor 20 detects the absorption amount of the detection target gas that has absorption characteristics with respect to infrared light and outputs a detection signal indicating the concentration of the detection target gas to the amplifier circuit/signal processing circuit 70. As the concentration of the detection target gas is higher, the amount of infrared light detected by the quantum infrared sensor 20 is smaller. As the concentration of the detection target gas is lower, the amount of infrared light detected by the quantum infrared sensor 20 is greater. The distance between the quantum infrared sensor 20 and the infrared light emitting diode 10 is preferably approximately 20 mm but is not limited to this distance.

The detection target gas is preferably a type of gas having absorption characteristics relative to light in the wavelength region of 2.0 μm to 12.0 μm. Non-limiting examples of the detection target gas include $CO_2$, CO, $CH_4$, $H_2O$, NO, $C_2H_5OH$, $C_3H_8$, $NH_3$, and $CH_2O$.

The quantum infrared sensor 20 may further include an optical filter that has the function of transmitting a certain wavelength of light. Examples of the optical filter include a bandpass filter that transmits light in the absorption wavelength region of the detection target gas. In the case of detecting carbon dioxide, for example, a bandpass filter that selectively transmits light around 4.3 μm may be used.

The quantum infrared sensor 20 is preferably mounted on the same substrate as the infrared light emitting diode 10. When the quantum infrared sensor 20 and the infrared light emitting diode 10 are mounted on the same substrate, separate substrates need not be prepared, which can reduce manufacturing costs. The detection accuracy can also be increased by virtue of the quantum infrared sensor 20 and the infrared light emitting diode 10 being mounted on the same substrate.

The quantum infrared sensor 20 is preferably configured by an element that is highly sensitive and has little noise. Examples of a quantum infrared sensor include a phototube, a photodiode, and a phototransistor.

Figure 3A:
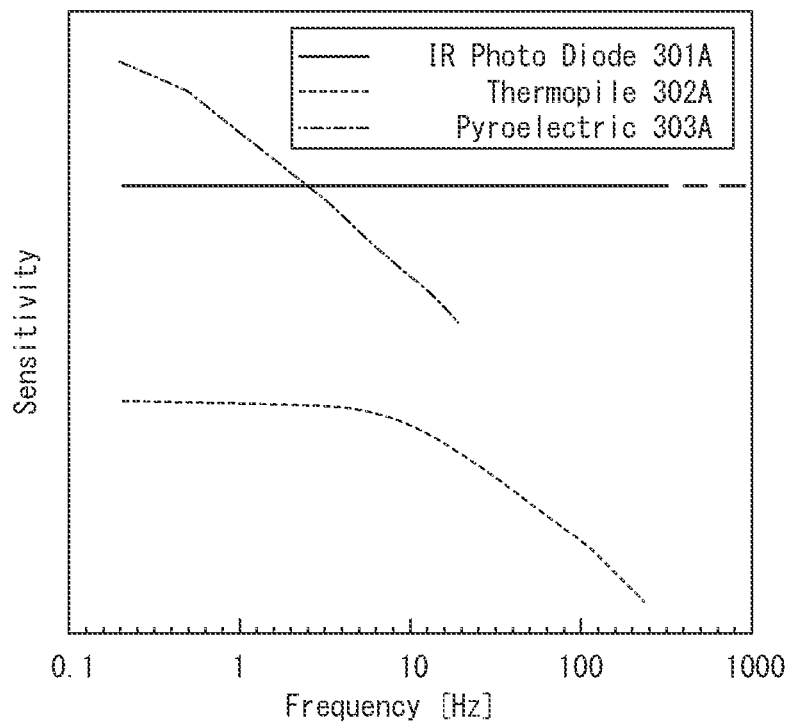
FIG. 3A is a diagram illustrating an example of the sensitivity of a quantum infrared sensor according to the present embodiment and the sensitivity of a known light detector.
Figure 3B:
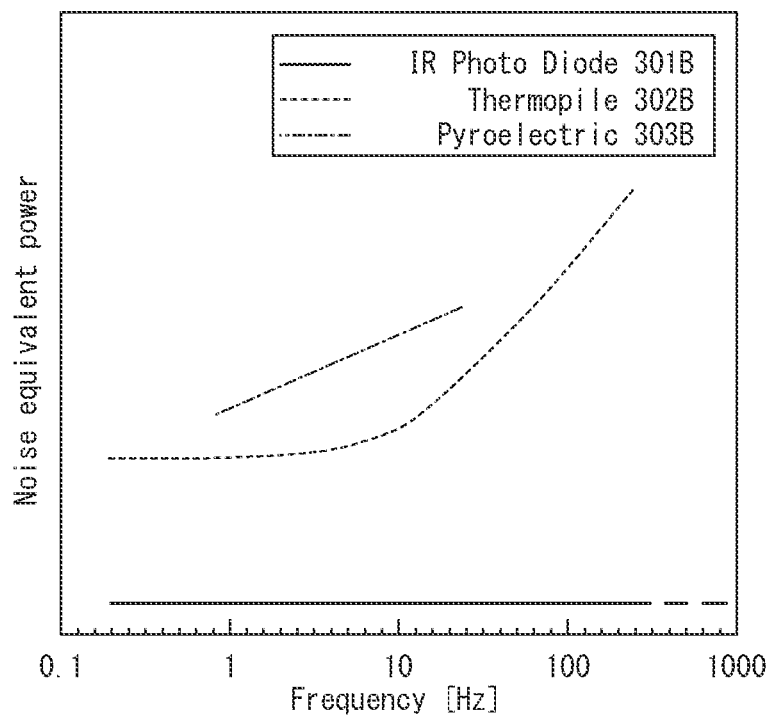
FIG. 3B is a diagram illustrating an example of the noise equivalent power of the quantum infrared sensor according to the present embodiment and the noise equivalent power of the known light detector.

With reference to FIGS. 3A and 3B, the sensitivity and noise equivalent power of the quantum infrared sensor 20 according to the present embodiment and the sensitivity and noise equivalent power of a known light emitter are now described. FIG. 3A illustrates an example of the relationship between frequency and sensitivity. The horizontal axis represents frequency [Hz], and the vertical axis represents sensitivity [$V_{rms}/W_{rms}$]. FIG. 3B illustrates an example of the relationship between frequency and noise equivalent power. The horizontal axis represents frequency [Hz], and the vertical axis represents noise equivalent power [$W_{rms}$/rtHz].

The graph 301A in FIG. 3A indicates the sensitivity of a quantum infrared sensor. The graph 302A in FIG. 3A indicates the sensitivity of a thermopile. The graph 303A in FIG. 3A indicates the sensitivity of a pyroelectric sensor.

The graph 301B in FIG. 3B indicates the noise equivalent power of the quantum infrared sensor. The graph 302B in FIG. 3B indicates the noise equivalent power of the thermopile. The graph 303B in FIG. 3B indicates the noise equivalent power of the pyroelectric sensor.

From the graph 301A in FIG. 3A, it is clear that the sensitivity of the quantum infrared sensor is high overall and is substantially constant when the frequency changes. From the graph 302A in FIG. 3A, it is clear that the sensitivity of the thermopile is low overall, and although substantially constant up to a frequency of 10 Hz, the sensitivity rapidly drops at frequencies of 10 Hz or higher. From the graph 303A in FIG. 3A, it is clear that the sensitivity of the pyroelectric sensor drops as the frequency rises.

From the graph 301B in FIG. 3B, it is clear that the noise equivalent power of the quantum infrared sensor is low overall and is substantially constant when the frequency changes. From the graph 302B in FIG. 3B, it is clear that the noise equivalent power of the thermopile is high overall, and although substantially constant up to a frequency of 10 Hz, the noise equivalent power rapidly rises at frequencies of 10 Hz or higher. From the graph 303B in FIG. 3B, it is clear that the noise equivalent power of the pyroelectric sensor is high overall and rises as the frequency increases.

From FIGS. 3A and 3B, it is clear that the quantum infrared sensor has higher, more stable sensitivity than the thermopile or the pyroelectric sensor. It is also clear that the quantum infrared sensor has smaller and more stable noise than the thermopile or the pyroelectric sensor.

This suggests that when an infrared light emitting diode and a quantum infrared sensor are combined, the drive time of the infrared light emitting diode 10 each time can be greatly shortened compared to when a tungsten lamp or MEMS heater is combined with a thermopile or pyroelectric sensor. For example, the drive time can be kept to 1 ms or less.

To charge the capacitor 40 sufficiently, the product of the charge current and the charge time is preferably equal to or greater than the product of the drive current and the drive time.

The drive circuit 30 is provided between the infrared light emitting diode 10 and the capacitor 40. The drive circuit 30 is connected to the capacitor 40 via a switch SW2 and is connected to the infrared light emitting diode 10. The drive circuit 30 is supplied with the drive current $I_{drive}$ of the infrared light emitting diode 10 from the capacitor 40 by the capacitor 40 discharging. The drive circuit 30 supplies the drive current $I_{drive}$ to the infrared light emitting diode 10. The drive current $I_{drive}$ of the infrared light emitting diode 10 is preferably approximately 100 mA. The larger the drive current $I_{drive}$ of the infrared light emitting diode 10 is, the larger the light emission amount of the infrared light emitting diode 10 becomes, allowing a good SN ratio to be achieved.

The capacitor 40 is provided between the charging circuit 50 and the drive circuit 30. The capacitor 40 is connected to the charging circuit 50 via a switch SW1 and is connected to the drive circuit 30 via the switch SW2. When the switch SW1 turns on, the capacitor 40 is charged by the charging circuit 50, the capacitor voltage of the capacitor 40 rises, and the charge current $I_{charge}$ of the capacitor 40 flows between the power source 60 and the capacitor 40. When the switch SW1 turns off, the charge current $I_{charge}$ of the capacitor 40 does not flow between the power source 60 and the capacitor 40. When the switch SW2 turns on, then the capacitor 40 discharges by supplying the drive current $I_{drive}$ of the infrared light emitting diode 10 to the drive circuit 30, the capacitor voltage of the capacitor 40 falls, and the drive current $I_{drive}$ of the infrared light emitting diode 10 flows between the capacitor 40 and the infrared light emitting diode 10. When the switch SW2 turns off, the drive current $I_{drive}$ of the infrared light emitting diode 10 does not flow between the capacitor 40 and the infrared light emitting diode 10. The switch SW1 and the switch SW2 do not turn on at the same time. The switch SW2 turns off when the switch SW1 is on, whereas the switch SW1 turns off when the switch SW2 is on.

The charge current $I_{charge}$ of the capacitor 40 is a current with a smaller current amount than the drive current $I_{drive}$ of the infrared light emitting diode 10. To decrease power consumption and improve measurement accuracy, the charge current $I_{charge}$ is preferably an average of the drive current. The charge current $I_{charge}$ of the capacitor 40 is preferably approximately 1/100 of the drive current $I_{drive}$ of the infrared light emitting diode 10. For example, when the detection cycle of a non-dispersive infrared (NDIR) gas sensor is 10 s, then the drive current $I_{drive}$ of the infrared light emitting diode 10 is the instantaneous current between the capacitor 40 and the infrared light emitting diode 10 for 0.1 ms at 100 mA, 1000 times, and the charge current $I_{charge}$ of the capacitor 40 is the current flowing regularly between the power source 60 and the capacitor 40 for 9.9 s at 1.01 mA.

The capacitor 40 is charged by the charge current $I_{charge}$ of the capacitor 40, which is a smaller current amount than the drive current $I_{drive}$ of the infrared light emitting diode 10, being supplied from the charging circuit 50 to the capacitor 40. The capacitor 40 discharges by the drive current $I_{drive}$ of the infrared light emitting diode 10 being supplied from the capacitor 40 to the drive circuit 30. In this way, the drive circuit 30 need not draw the drive current $I_{drive}$ of the infrared light emitting diode 10 directly from the power source 60 in the gas sensor module 100. The load on the power source 60 can therefore be significantly reduced. In other words, when the power source 60 and the drive circuit 30 are connected via the charging circuit 50, the switch SW1, the capacitor 40, and the switch SW2, as in the gas sensor module 100 according to the present embodiment, the load on the power source 60 can be significantly reduced as compared to when a power source 60A and a drive circuit 30A are directly connected as in a known gas sensor module 100 (see FIG. 7). Furthermore, the light emission amount of the infrared light emitting diode 10 can be kept to the same degree as the light emission amount of a light emitter 10A that is a tungsten lamp or a MEMS heater.

The capacitor 40 is preferably configured by an element with low capacity and is preferably a multilayer ceramic capacitor, for example, from the perspectives of size, cost, and leakage current. The capacity of the capacitor 40 is preferably 1 mF or less.

The relationship between the voltage drop due to discharging of the capacitor and the capacity of the capacitor is now explained with reference to FIG. 4. The horizontal axis represents the voltage drop $\Delta V$ [mV], and the vertical axis represents the capacity of the capacitor $C_{bulk}$ [F].

Figure 4:
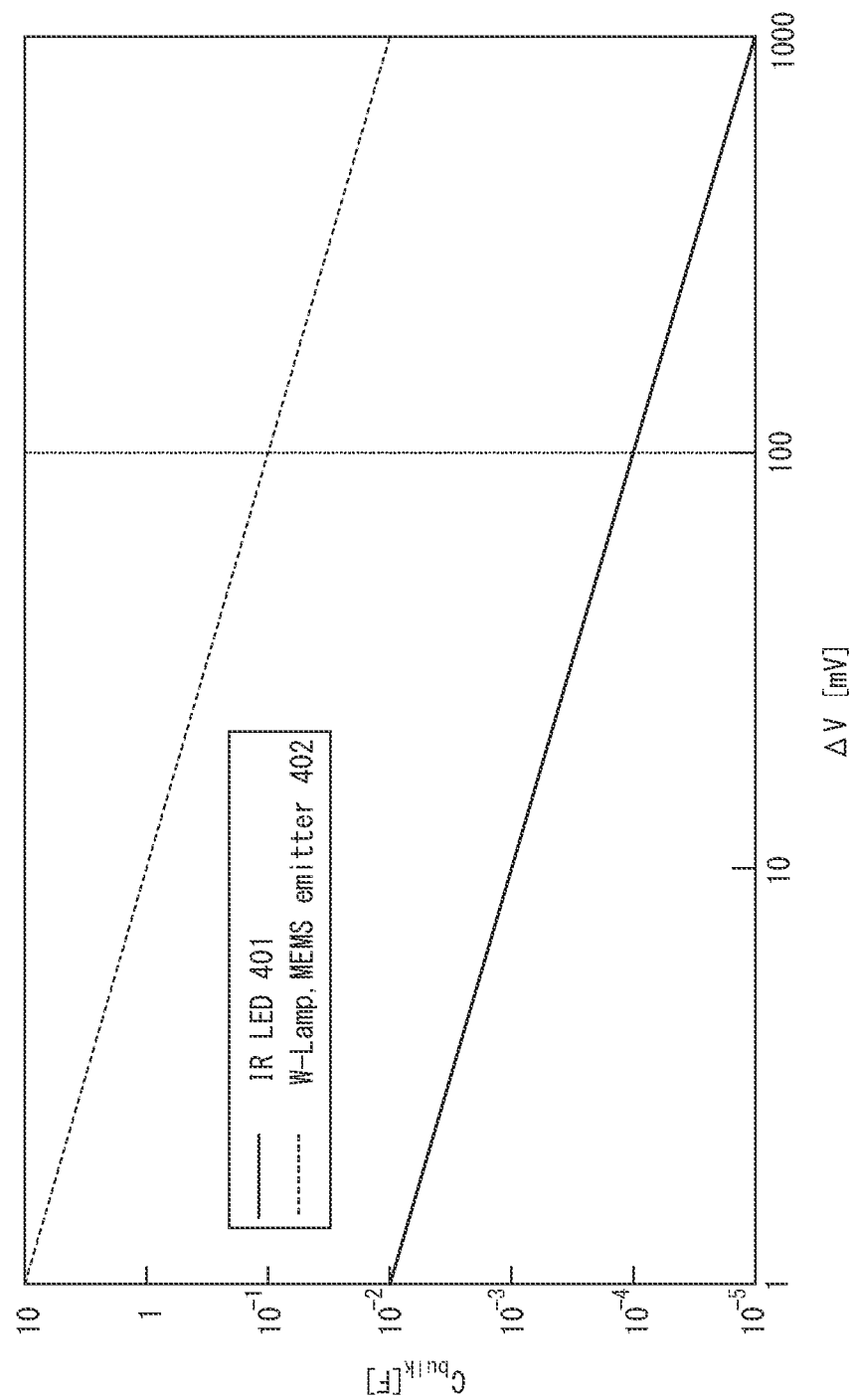
FIG. 4 is a diagram illustrating an example of the relationship between a voltage drop of a power source due to discharging of a capacitor and the capacity of the capacitor.

The graph 401 in FIG. 4 indicates the capacity of the capacitor when an infrared light emitting diode is used in the gas sensor module, i.e. when the drive time of the infrared light emitting diode each time is 100 μs. The graph 402 in FIG. 4 indicates the capacity of the capacitor when a tungsten lamp or a MEMS heater is used in the gas sensor module, i.e. when the drive time of the tungsten lamp or MEMS heater each time is 100 ms. In FIG. 4, the drive current of the infrared light emitting diode and the drive current of the tungsten lamp or MEMS heater are both 100 mA.

From the graph 401 in FIG. 4, it is clear that as the voltage drop $\Delta V$ is larger, the capacity $C_{bulk}$ of the capacitor becomes smaller. For example, when the voltage drop $\Delta V$ is 1 mV, the capacity $C_{bulk}$ of the capacitor is 10 mF, whereas when the voltage drop $\Delta V$ is 100 mV, the capacity $C_{bulk}$ of the capacitor is 100 μF.

From the graph 402 in FIG. 4, it is clear that as the voltage drop $\Delta V$ is larger, the capacity $C_{bulk}$ of the capacitor becomes smaller. For example, when the voltage drop $\Delta V$ is 1 mV, the capacity $C_{bulk}$ of the capacitor is 10 F, whereas when the voltage drop $\Delta V$ is 100 mV, the capacity $C_{bulk}$ of the capacitor is 100 mF.

From FIG. 4, it is clear that the capacity of the capacitor is such that the necessary capacity $C_{bulk}$ of the capacitor becomes smaller as the allowable voltage drop $\Delta V$ grows larger. The capacity is also proportional to the drive time of the infrared light emitting diode each time. This suggests that the capacity of the capacitor when an infrared light emitting diode is used in the gas sensor module can be made extremely small as compared to the capacity of the capacitor when a tungsten lamp or MEMS heater is used in the gas sensor module.

Examples of the capacitor when an infrared light emitting diode is used in the gas sensor module include a multilayer ceramic capacitor. Multilayer ceramic capacitors have a capacity often on the order of μF, a small size, a low cost, and substantially no leakage current. Examples of the capacitor when a tungsten lamp or MEMS heater is used as the gas sensor module include an electric double layer capacitor. Electric double layer capacitors have a capacity often on the order of mF, a large size, a high cost, and leakage current on the order of μA.

In other words, by the gas sensor module 100 including an NDIR gas sensor that combines an infrared light emitting diode and a quantum infrared sensor, the drive time of the infrared light emitting diode 10 each time can be made extremely short. The capacity of the capacitor 40 can therefore be kept extremely small. The size and costs can thereby be reduced not only for the capacitor 40, but for the gas sensor module 100 overall.

The charging circuit 50 is provided between the power source 60 and the capacitor 40. The charging circuit 50 is connected to the power source 60 and is connected to the capacitor 40 via the switch SW1. The charging circuit 50 is supplied with the charge current $I_{charge}$ of the capacitor 40, which is a smaller current amount than the drive current $I_{drive}$ of the infrared light emitting diode 10, from the power source 60. The charging circuit 50 supplies the charge current $I_{charge}$ to the capacitor 40 to charge the capacitor 40. The charge current $I_{charge}$ of the capacitor 40 is preferably approximately 1 mA. For example, when the detection cycle of an NDIR gas sensor is 10 s, the charging circuit 50 regularly supplies a current for 9.9 s at 1.01 mA to the capacitor 40, whereas the drive circuit 30 supplies an instantaneous current for 0.1 ms at 100 mA, 1000 times to the infrared light emitting diode 10.

Any appropriate charging means with a sufficiently low current supply capability, such as approximately 1/100 that of the drive circuit 30, may be used as the charging circuit 50. Examples of the charging circuit 50 include a resistor, a current source, a DC/DC converter, and a charge pump.

By the charging circuit 50 and the capacitor 40 having the function of averaging the drive current $I_{drive}$ of the infrared light emitting diode 10, the light emission amount of the infrared light emitting diode 10 can be kept to the same degree as the light emission amount of the light emitter 10A while significantly reducing the load on the power source 60.

<Timing Chart>

Next, the differences between the gas sensor module 100 according to the present embodiment and the known gas sensor module 100A are described with reference to FIGS. 5A, 5B, 5C, 6, and 7. The case of the detection cycle of the NDIR gas sensor being 10 s is described as an example.

[Gas Sensor Module 100 According to Present Embodiment]

The state of the infrared light emitting diode 10, the drive current $I_{drive}$ of the infrared light emitting diode 10, the capacitor voltage $V_c$ of the capacitor 40, the charge current $I_{charge}$ of the capacitor 40, the state of the drive circuit 30, and the state of the amplifier circuit/signal processing circuit 70 in the gas sensor module 100 according to the present embodiment are described with reference to FIG. 5A.

The infrared light emitting diode 10 repeats the sequence of staying in a non-light-emitting state, switching from the non-light-emitting state to a light-emitting state, staying in the light-emitting state, and switching from the light-emitting state to the non-light-emitting state. The number of times the infrared light emitting diode 10 emits light is 1000 for a detection cycle of 10 s. The drive time of the infrared light emitting diode 10 each time is 100 µs. The non-drive time of the infrared light emitting diode 10 each time is 9900 µs.

The drive current $I_{drive}$ of the infrared light emitting diode 10 repeats the sequence of staying at 0 mA, switching from 0 mA to 100 mA, staying at 100 mA, and switching from 100 mA to 0 mA. When the drive current $I_{drive}$ of the infrared light emitting diode 10 stays at 0 mA, the infrared light emitting diode 10 stays in the non-light-emitting state. When the drive current $I_{drive}$ of the infrared light emitting diode 10 switches from 0 mA to 100 mA, the infrared light emitting diode 10 switches from the non-light-emitting state to the light-emitting state. When the drive current $I_{drive}$ of the infrared light emitting diode 10 stays at 100 mA, the infrared light emitting diode 10 stays in the light-emitting state. When the drive current $I_{drive}$ of the infrared light emitting diode 10 switches from 100 mA to 0 mA, the infrared light emitting diode 10 switches from the light-emitting state to the non-light-emitting state.

The drive circuit 30 repeats the sequence of staying in an off state, switching from the off state to an on state, staying in the on state, and switching from the on state to the off state. The number of times the drive circuit 30 turns on/off is 1000 for a detection cycle of 10 s. The on time of the drive circuit 30 each time is 100 µs. The off time of the drive circuit 30 each time is 9900 µs. The duty cycle is expressed as (on time of drive circuit 30 each time×number of times drive circuit 30 turns on/off)/(detection cycle of NDIR gas sensor). Hence, the duty cycle=(100 µs×1000)/10 s=1%, for example. When the drive circuit 30 stays in the off state, the infrared light emitting diode 10 stays in the non-light-emitting state. When the drive circuit 30 switches from the off state to the on state, the infrared light emitting diode 10 switches from the non-light-emitting state to the light-emitting state. When the drive circuit 30 stays in the on state, the infrared light emitting diode 10 stays in the light-emitting state. When the drive circuit 30 switches from the on state to the off state, the infrared light emitting diode 10 switches from the light-emitting state to the non-light-emitting state.

The capacitor voltage $V_c$ of the capacitor 40 repeatedly rises and falls. When the switch SW1 turns on (see FIG. 5B and FIG. 5C), the charge current $I_{charge}$ of the capacitor 40 flows between the power source 60 and the capacitor 40, and as a result of the capacitor 40 charging, the capacitor voltage $V_c$ of the capacitor 40 rises. In this case, the infrared light emitting diode 10 stays in the non-light-emitting state. When the switch SW2 turns on (see FIG. 5B and FIG. 5C), the drive current $I_{drive}$ of the infrared light emitting diode 10 flows between the capacitor 40 and the drive circuit 30, and as a result of the capacitor 40 discharging, the capacitor voltage $V_c$ of the capacitor 40 falls. In this case, the infrared light emitting diode 10 stays in the light-emitting state.

The charge current $I_{charge}$ of the capacitor 40 is equivalent to the current of the power source 60. The charge current $I_{charge}$ of the capacitor 40 is a current with a smaller current amount than the drive current $I_{drive}$ of the infrared light emitting diode 10, and the necessary current amount is expressed as (drive current $I_{drive}$ of infrared light emitting diode 10×on time/off time). Hence, the charge current $I_{charge}$ of the capacitor 40=(100 mA×(100 µs×1000)/(9900 µA×1000))=1.01 mA, for example. In other words, the charge current $I_{charge}$ of the capacitor 40 is 1/99 of the drive current $I_{drive}$ of the infrared light emitting diode 10. As is clear from FIG. 5A, the drive current $I_{drive}$ of the infrared light emitting diode 10 is the current flowing instantaneously between the capacitor 40 and the infrared light emitting diode 10 for 0.1 ms at 100 mA, 1000 times in the detection cycle of 10 s. The charge current $I_{charge}$ of the capacitor 40, however, is the current flowing regularly between the power source 60 and the capacitor 40 for 9.9 s at 1.01 mA in the detection cycle of 10 s. In other words, by the charging circuit 50 and the capacitor 40 having the function of averaging the drive current $I_{drive}$ of the infrared light emitting diode 10, the light emission amount of the infrared light emitting diode 10 can be kept to the same degree as the light emission amount of the light emitter 10A while significantly reducing the load on the power source 60. It suffices for the charge current $I_{charge}$ to be capable of completely charging the capacitor 40 within the corresponding time. The charge current $I_{charge}$ is therefore greater than 1.01 mA and may, for example, be 2 mA.

The amplifier circuit/signal processing circuit 70 repeats the sequence of staying in an off state, switching from the off state to an on state, staying in the on state, and switching from the on state to the off state. The number of times the amplifier circuit/signal processing circuit 70 turns on/off is 1000 for a detection cycle of 10 s. The on time of the amplifier circuit/signal processing circuit 70 each time is 100 μs. The off time of the amplifier circuit/signal processing circuit 70 each time is 9900 μs. At the time the amplifier circuit/signal processing circuit 70 switches from the on state to the off state for the $1000^{th}$ time, a detection signal is outputted from the quantum infrared sensor 20 to the amplifier circuit/signal processing circuit 70.

Figure 5B:
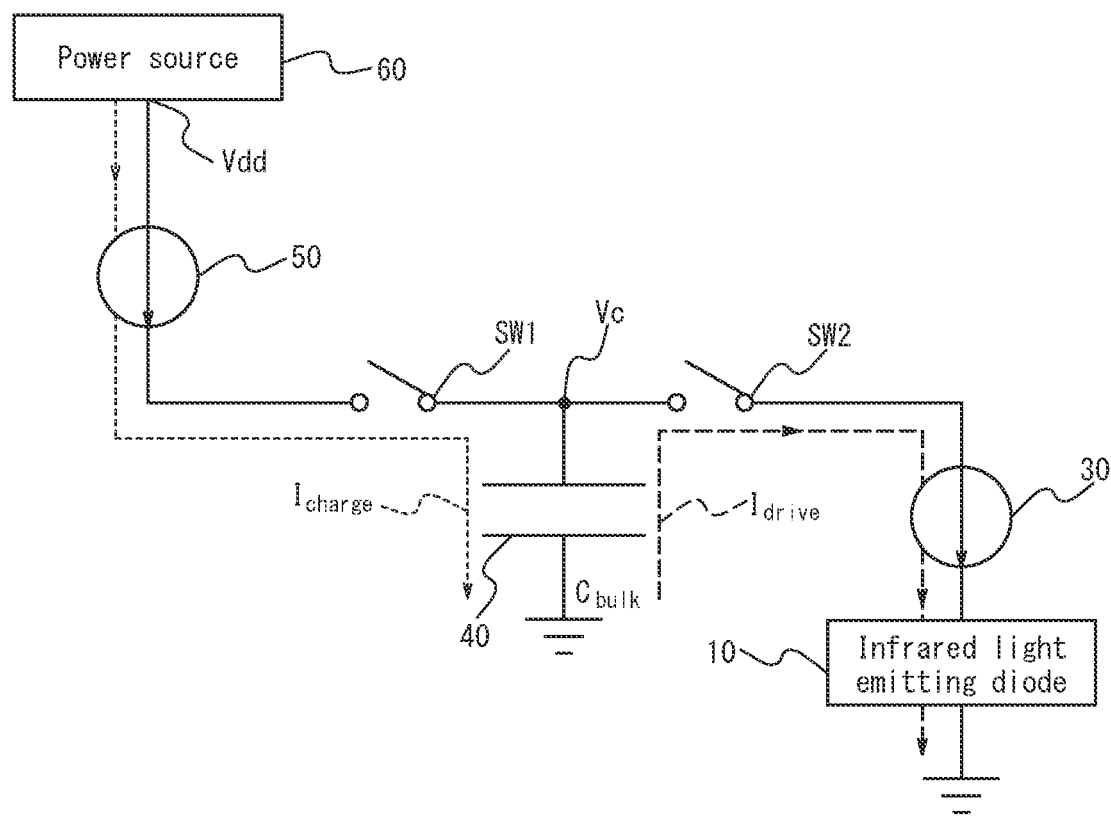
FIG. 5B is a diagram illustrating the gas sensor module according to the present embodiment.
Figure 5C:
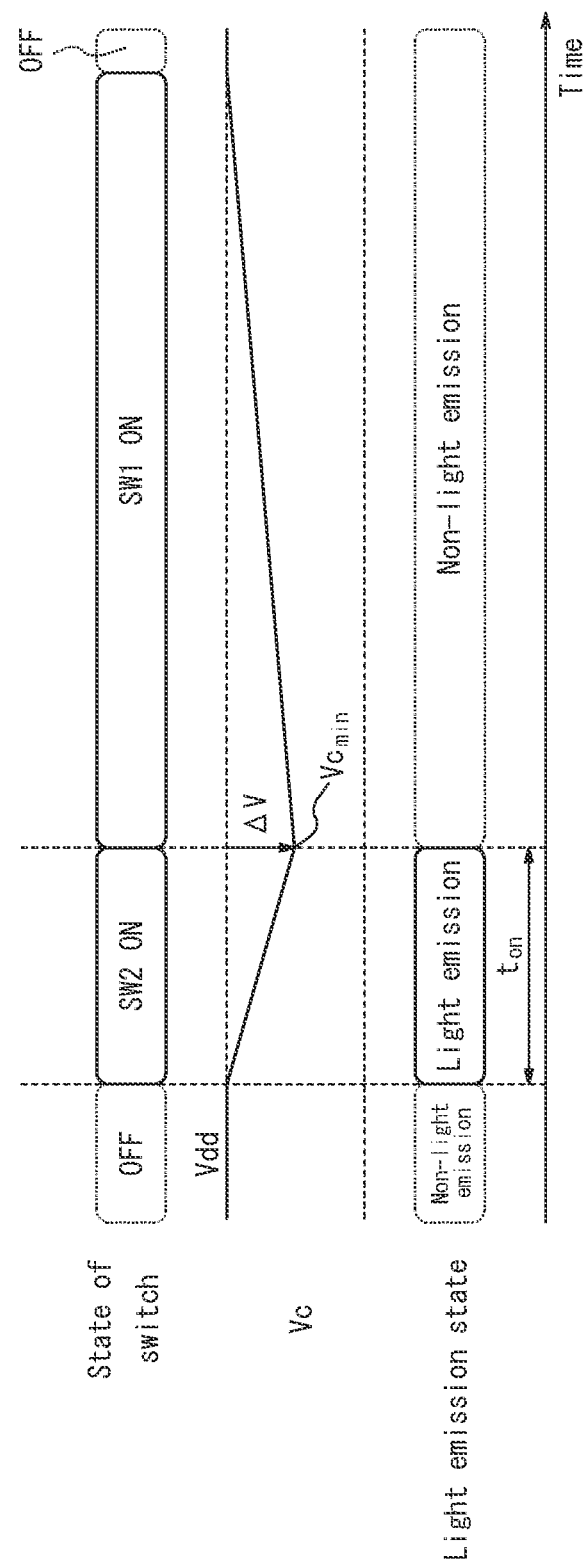
FIG. 5C is a diagram illustrating the gas sensor module according to the present embodiment.

Next, the capacitor voltage $V_c$ of the capacitor 40 and details on the capacitor voltage $V_c$ of the capacitor 40 are described with reference to FIGS. 5B and 5C.

When the switch SW2 turns on, the capacitor 40 and the drive circuit 30 are connected, and the drive current $I_{drive}$ of the infrared light emitting diode 10 flows between the capacitor 40 and the infrared light emitting diode 10. In this case, the capacitor voltage $V_c$ of the capacitor 40 falls, and the capacitor 40 discharges by supplying the drive current $I_{drive}$ of the infrared light emitting diode 10 to the drive circuit 30.

At the time of switching from the switch SW2 to the switch SW1, the voltage drop $\Delta V$ of the capacitor voltage $V_c$ due to discharging of the capacitor 40 becomes the difference between the voltage $V_{dd}$ of the power source 60 and the minimum $V_{cmin}$ of the capacitor voltage $V_c$ of the capacitor 40 and is therefore expressed by the following equation. To reduce power consumption of the gas sensor module 100, the voltage drop $\Delta V$ of the capacitor voltage $V_c$ due to discharging of the capacitor 40 is preferably approximately several hundred mV.

$$\Delta V = V_{dd} - V_{cmin} \quad (1)$$

When the switch SW1 turns on, the charging circuit 50 and the capacitor 40 are connected, and the charge current $I_{charge}$ of the capacitor 40 flows between the power source 60 and the capacitor 40. In this case, the capacitor voltage $V_c$ of the capacitor 40 rises, and the capacitor 40 is charged by the charge current $I_{charge}$ of the capacitor 40 being supplied to the capacitor 40.

Here, the capacitor voltage $V_c$ of the capacitor 40 needs to satisfy the following equation.

$$V_c > V_{emitter} + V_{ds} \quad (2)$$

$V_{emitter}$ is the drive voltage of the infrared light emitting diode 10. $V_{ds}$ is the voltage required for normal operation of the drive circuit 30.

The voltage drop $\Delta V$ of the capacitor voltage $V_c$ needs to satisfy the following equation.

$$\Delta V < V_{dd} - (V_{emitter} + V_{ds}) \quad (3)$$

Accordingly, the capacity $C_{bulk}$ of the capacitor 40 is selected so that the voltage drop $\Delta V$ of the capacitor voltage $V_c$ is smaller than the result of subtracting the sum of the drive voltage $V_{emitter}$ of the infrared light emitting diode 10 and the voltage $V_{ds}$ necessary for normal operation of the drive circuit 30 from the voltage $V_{dd}$ of the power source 60. The capacity $C_{bulk}$ of the capacitor 40 is expressed by the following equation.

$$I_{drive} \times t_{ON} = C_{bulk} \times \Delta V$$

$$\therefore C_{bulk} = (I_{drive} \times t_{ON}) / \Delta V \quad (4)$$

Here, $t_{ON}$ is the drive time of the infrared light emitting diode 10 each time.

From Equation (4), it is clear that the capacity $C_{bulk}$ of the capacitor 40 is a function substantially proportional to the drive time $t_{ON}$ of the infrared light emitting diode 10 each time. In other words, it is clear that as the drive time of the infrared light emitting diode 10 each time is shorter, the capacity $C_{bulk}$ of the capacitor 40 can be made smaller.

It is thus clear that by the gas sensor module 100 including an NDIR gas sensor that combines an infrared light emitting diode and a quantum infrared sensor, the drive time $t_{ON}$ of the infrared light emitting diode 10 each time can be made extremely short. The capacity $C_{bulk}$ of the capacitor 40 can therefore be kept extremely small.

[Known Gas Sensor Module 100A]

Figure 6:
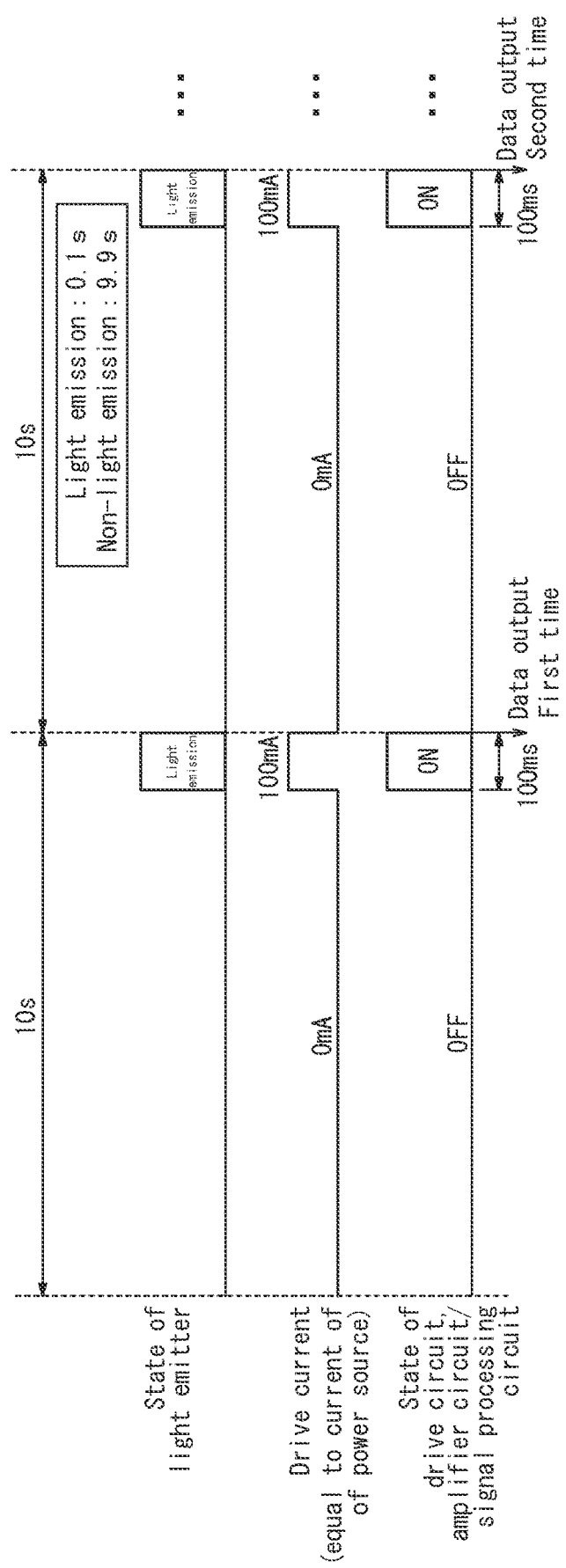
FIG. 6 is a diagram illustrating a known gas sensor module.
Figure 7:
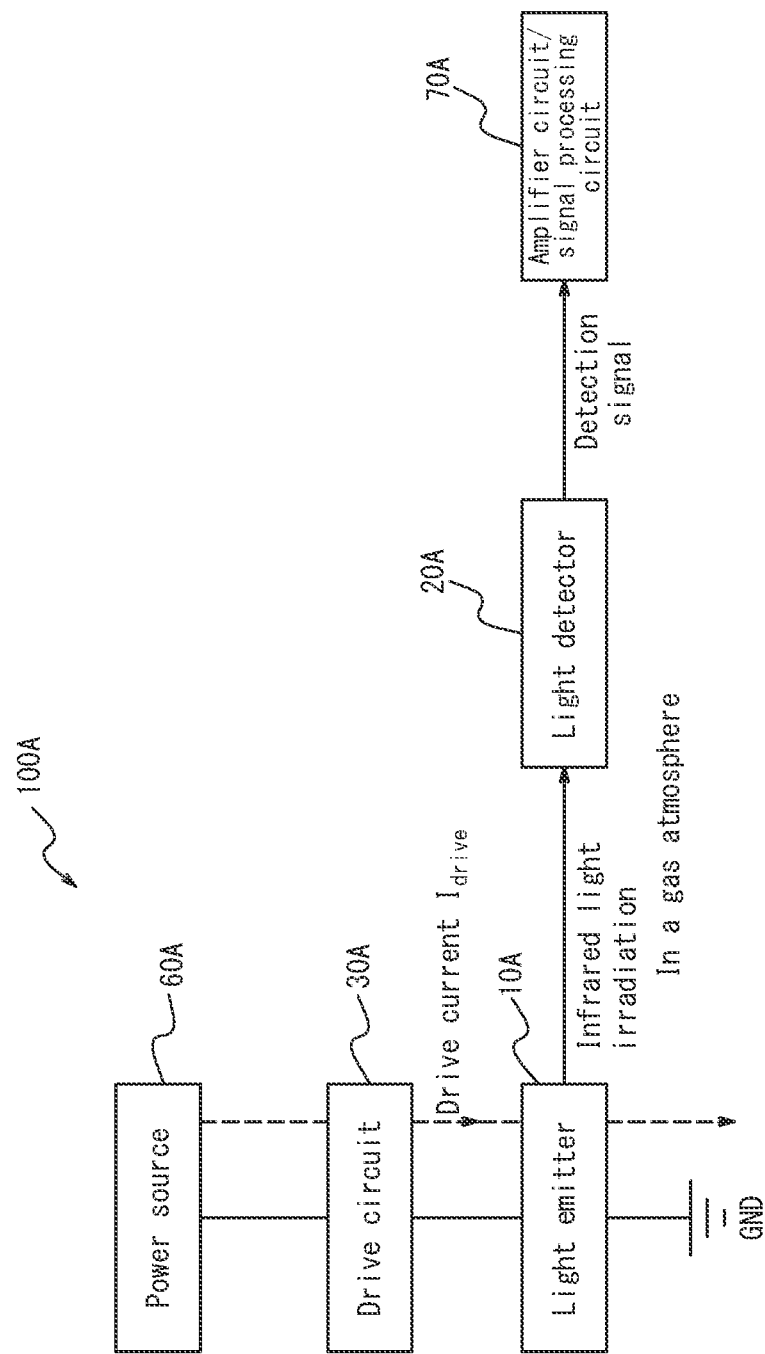
FIG. 7 is a diagram illustrating an example configuration of a known gas sensor module.

The state of the light emitter 10A, the drive current $I_{drive}$ of the light emitter 10A, the state of the drive circuit 30A, and the state of an amplifier circuit/signal processing circuit 70A in the known gas sensor module 100A are described with reference to FIGS. 6 and 7.

The light emitter 10A repeats the sequence of staying in a non-light-emitting state, switching from the non-light-emitting state to a light-emitting state, staying in the light-emitting state, and switching from the light-emitting state to the non-light-emitting state. The number of times the light emitter 10A emits light is once for a detection cycle of 10 s. The drive time of the light emitter 10A each time is 0.1 s. The non-drive time of the light emitter 10A each time is 9.9 s.

The drive current $I_{drive}$ of the light emitter 10A is equivalent to the current of the power source 60A. The drive current $I_{drive}$ of the light emitter 10A repeats the sequence of staying at 0 mA, switching from 0 mA to 100 mA, staying at 100 mA, and switching from 100 mA to 0 mA. When the drive current $I_{drive}$ of the light emitter 10A stays at 0 mA, the light emitter 10A stays in the non-light-emitting state. When the drive current $I_{drive}$ of the light emitter 10A switches from 0 mA to 100 mA, the light emitter 10A switches from the non-light-emitting state to the light-emitting state. When the drive current $I_{drive}$ of the light emitter 10A stays at 100 mA, the light emitter 10A stays in the light-emitting state. When the drive current $I_{drive}$ of the light emitter 10A switches from 100 mA to 0 mA, the light emitter 10A switches from the light-emitting state to the non-light-emitting state.

The drive circuit 30A repeats the sequence of staying in an off state, switching from the off state to an on state, staying in the on state, and switching from the on state to the off state. The number of times the drive circuit 30A turns on/off is once for a detection cycle of 10 s. The on time of the drive circuit 30A each time is 0.1 s. The off time of the drive circuit 30A each time is 9.9 s. The duty cycle is expressed as (on time of drive circuit 30A each time×number of times drive circuit 30A turns on/off)/(detection cycle of NDIR gas sensor). Hence, the duty cycle=(0.1 s×1)/10 s=1%, for example. When the drive circuit 30A stays in the off state, the light emitter 10A stays in the non-light-emitting state. When the drive circuit 30A switches from the off state to the on state, the light emitter 10A switches from the non-light-emitting state to the light-emitting state. When the drive circuit 30A stays in the on state, the light emitter 10A stays in the light-emitting state. When the drive circuit 30A switches from the on state to the off state, the light emitter 10A switches from the light-emitting state to the non-light-emitting state.

The amplifier circuit/signal processing circuit 70A repeats the sequence of staying in an off state, switching from the off state to an on state, staying in the on state, and switching from the on state to the off state. The number of times the amplifier circuit/signal processing circuit 70A turns on/off is once for a detection cycle of 10 s. The on time of the amplifier circuit/signal processing circuit 70A each time is 0.1 s. The off time of the amplifier circuit/signal processing circuit 70A each time is 9.9 s. At the time the amplifier circuit/signal processing circuit 70A switches from the on state to the off state for the first time, a detection signal is outputted from a light detector 20A, such as a pyroelectric sensor or thermopile, to the amplifier circuit/signal processing circuit 70A.

[Comparison]

As described above, the drive time of the infrared light emitting diode 10 each time is $1/1000$ of the drive time of the light emitter 10A each time. It is thus clear that the gas sensor module 100 according to the present embodiment can achieve an extremely shorter drive time for the infrared light emitting diode each time than the known gas sensor module 100A.

It is also clear that the peak current of the power source 60 is $1/100$ of the peak current of the power source 60A. It is thus clear that the gas sensor module 100 according to the present embodiment can significantly reduce the load on the power source as compared to the known gas sensor module 100A.

It is also clear that the on time of the drive circuit 30A each time is $1/1000$ of the on time of the drive circuit 30A each time. In other words, it is clear that as compared to the known gas sensor module 100A, the gas sensor module 100 according to the present embodiment can significantly reduce the load on the power source, since even for an equivalent duty cycle, the on time of the drive circuit 30 when the infrared light emitting diode 10 emits light each time can be made shorter than the on time of the drive circuit 30A when the light emitter 10A emits light each time.

The gas sensor module 100 according to the present embodiment takes advantage of regular light emission by the infrared light emitting diode 10 included in the NDIR gas sensor so that the charging circuit 50 charges the capacitor 40 with a smaller current amount than the drive current $I_{drive}$ of the infrared light emitting diode 10, and the capacitor 40 supplies the drive current $I_{drive}$ of the infrared light emitting diode 10 to the drive circuit 30. In this way, the load on the power source 60 can be significantly reduced as compared to the known gas sensor module 100A, without a change in the light emission amount of the infrared light emitting diode 10. Furthermore, the gas sensor module 100 according to the present embodiment can stabilize its own operations without adversely affecting the operations of other devices mounted on the same substrate (such as another environmental sensor).

By the gas sensor module 100 according to the present embodiment including an NDIR gas sensor that combines an infrared light emitting diode and a quantum infrared sensor, the drive time of the infrared light emitting diode 10 each time can be made extremely short as compared to a combination of a tungsten lamp or MEMS heater with a thermopile or pyroelectric sensor. The capacity of the capacitor 40 can therefore be made extremely small, enabling a reduction in size and cost of the gas sensor module 100 overall.

<Modifications>

The present disclosure is not limited to the above-described embodiment and modifications. For example, the above-described processes may be executed not only in the above chronological order but may also be executed in parallel or individually as needed, or in accordance with the processing capability of the apparatus executing the processes. Other modifications may be made within the spirit and scope of the present disclosure.

A circuit for a gas sensor module according to an embodiment includes a drive circuit, a charging circuit, and a capacitor. The drive circuit is configured to output a drive current to an infrared light emitting diode of a non-dispersive infrared gas sensor that includes the infrared light emitting diode, which is configured to emit infrared light in accordance with the drive current, and a quantum infrared sensor configured to detect infrared light that passes through a detection target gas. The charging circuit is configured to output a charge current having a smaller current amount than the drive current. The capacitor is configured to charge by the charge current being supplied from the charging circuit and discharge by supplying the drive current to the drive circuit.

In the circuit for a gas sensor module according to an embodiment, the product of the charge current and a charge time may be equal to or greater than the product of the drive current and a drive time.

In the circuit for a gas sensor module according to an embodiment, the drive time may be 1 ms or less.

In the circuit for a gas sensor module according to an embodiment, the duty cycle of the drive current may be 10% or less.

In the circuit for a gas sensor module according to an embodiment, the capacitor may be a multilayer ceramic capacitor.

In the circuit for a gas sensor module according to an embodiment, the capacity of the capacitor may be 1 mF or less.

The drive circuit, the charging circuit, the capacitor, and the like in the circuit for a gas sensor module may have the same features as those of the drive circuit, the charging circuit, the capacitor, and the like in the above-described gas sensor module.

The above embodiments have been described as representative examples, but it will be apparent to one of ordinary skill in the art that numerous modifications and replacements may be made within the spirit and scope of the present disclosure. Therefore, the present disclosure should not be interpreted as being restricted to the above embodiments. A variety of changes and modifications may be made without departing from the scope of the appended claims. For example, a plurality of the structural blocks indicated in the configuration diagrams of the embodiments may be combined into one, or one structural block may be divided into multiple parts.

The invention claimed is:

1. A gas sensor module comprising:
   an infrared light emitting diode configured to emit infrared light in accordance with a drive current;
   a quantum infrared sensor configured to detect infrared light that passes through a detection target gas;
   a drive circuit configured to output the drive current to the infrared light emitting diode;
   a charging circuit to be connected to a power source and configured to output a charge current having a smaller current amount than the drive current; and
   a capacitor configured to charge by the charge current being supplied from the charging circuit and discharge by supplying the drive current to the drive circuit, wherein a product of the charge current and a charge time is equal to or greater than a product of the drive current and a drive time, and the drive time is 1 ms or less.

2. The gas sensor module of claim 1, wherein a duty cycle of the drive current is 10% or less.

3. The gas sensor module of claim 1, wherein the capacitor is a multilayer ceramic capacitor.

4. The gas sensor module of claim 1, wherein a capacity of the capacitor is 1 mF or less.

5. A gas sensor module comprising:
   an infrared light emitting diode configured to emit infrared light in accordance with a drive current;
   a quantum infrared sensor configured to detect infrared light that passes through a detection target gas;
   a drive circuit configured to output the drive current to the infrared light emitting diode;
   a charging circuit to be connected to a power source and configured to output a charge current having a smaller current amount than the drive current; and
   a capacitor configured to charge by the charge current being supplied from the charging circuit and discharge by supplying the drive current to the drive circuit,
   wherein a duty cycle of the drive current is 10% or less.

* * * * *